United States Patent [19]

Bykhover et al.

[11] 4,067,708
[45] Jan. 10, 1978

[54] BAG FILTER FOR CLEANING DUST-LADEN GASES

[76] Inventors: Leonid Nosonovich Bykhover, ulitsa Peschanaya, 15, kv. 58; Dmitry Alexandrovich Zhuravlev, Istrinskaya ulitsa, 10, korpus 1, kv. 184; Vladimir Alexeevich Kozhemyakin, ulitsa Ostrovityanova, 21, kv. 155; Vladimir Grigorievich Levin, ulitsa Udaltsova, 4, kv. 351; Felix Betsialovich Ljutin, Nagornaya ulitsa, 62/6, kv. 19; Nikolai Nikolaevich Kotin, Profsojuznaya ulitsa, 91, korpus 2, kv. 15; Viktor Leonidovich Mitnik, Leningradsky prospekt, 78, korpus 1a, kv. 89; Isaak Leibovich Peisakhov, ulitsa Udaltsova, 4, kv. 295, all of Moscow; Gennady Vasilievich Malakhov, ulitsa Vatutina, 50-a, kv. 4, Ordzhonikidze; Anatoly Sergeevich Mukhin, ulitsa Chernyakhovskogo, 26, korpus 4, kv. 24, Ordzhonikidze; Eduard Kazimirovich Penionshek, ulitsa Kotsoeva, 99, Ordzhonikidze; Taimuraz Danilovich Sautiev, ulitsa Butyrina, 10, kv. 85, Ordzhonikidze, all of U.S.S.R.

[21] Appl. No.: 762,481

[22] Filed: Jan. 26, 1977

[51] Int. Cl.² .............................. B01D 46/04

[52] U.S. Cl. ........................... 55/304; 55/96; 55/291

[58] Field of Search .............. 55/96, 291, 302, 304, 55/305

[56] References Cited

U.S. PATENT DOCUMENTS

| 1,153,751 | 9/1915 | Beth | 55/304 |
| 1,388,294 | 8/1921 | Pedersen | 55/304 |
| 2,350,011 | 5/1944 | Black | 55/96 |
| 3,733,715 | 5/1973 | Hales | 55/304 |

*Primary Examiner*—Bernard Nozick
*Attorney, Agent, or Firm*—Steinberg & Blake

[57] ABSTRACT

A bag filter for cleaning dust-laden gases comprises rows of vertically extending bags accommodated in a casing. Open lower ends of the bags are fixed to and communicate with a hopper which is separated from the inner space of the casing. Upper ends of the bags are closed by caps supporting vertical rods connected to a mechanism for removing dust from the bag cloth. The mechanism comprises pulleys fixed to the rods and two flexible drawbars having their ends secured to each pulley so that they run therefrom in opposite directions. Other ends of the flexible drawbars are secured to horizontal bars extending along the pulleys and having a drive for causing their longitudinal reciprocations for rotating the caps and twisting the bags to break up dust layers on the filtering cloth.

1 Claim, 3 Drawing Figures

BAG FILTER FOR CLEANING DUST-LADEN GASES

The invention relates to the field of industrial dedusting, and more specifically to bag filters and may be used in cleaning dust-laden gases, especially those containing finely divided dust, practically in all industries where problems associated with gas cleaning arise. At present, the bag filters are most widely used all over the world for gas cleaning, and the field of their application is still enlarging.

Known in the art are various modifications of the construction of bag filters for cleaning gases from dust. The most critical element in the construction of bag filters is the mechanism for removing dust from filtering cloth of the bags for lowering flow resistance of the cloth. In known constructions, mechanisms for removing dust are mainly based on the reversed blowing and mechanical shaking. One well-known construction of bag filter for cleaning gas from dust comprises rows of substantially vertically extending bags of filtering cloth accommodated in a casing. Open lower ends of the bags are fixed to and communicate with a hopper for removed dust which is separated from the inner space of the casing. Upper ends of the bags are secured to caps supporting vertical rods connected to a mechanism for removing dust from the filtering cloth of the bags. For that purpose, the upper ends of the rods are provided with hooks for suspension of the rods to a common frame which is connected, by means of a connecting rod, to a mechanism for removing dust which comprises a drive providing for lifting and abrupt lowering of the frame for shaking the bags so that the dust is partially removed from the filtering cloth.

In addition to the mechanical shaking, or independently, reversed blowing is also performed at regular intervals. For that purpose, the supply of dust-laden gas to the bag filter is cut off, and air or filtered gas is fed in the direction opposite to that of dust-laden gas flow. Thus the dust is partially removed from the surface of the filtering cloth to the hopper.

The mechanism for removing dust of the known bag filter which uses shaking of the bags cannot, however, ensure efficient and uniform destruction of dust layer on the filtering cloth and its removal from the surface of the filtering cloth, while reversed blowing used in such filters does not enable elimination of this disadvantage. As a result, the known bag filters have low throughput capacity in terms of gas quantity, that is low filtering rate. As a result of this disadvantage inherent in the construction of bag filters, dust catching installations of some modern production plants are commensurable and even overpass in size, production area and investments the main production units.

At the same time, in the art is a method for removing dust from filtering cloth of the bags by means of continuous reversible twisting of the upper ends of the bags. By this method, a continuous destruction of dust layer over the entire surface of the filtering cloth is obtained thus providing for efficient regeneration of the cloth.

In spite of relatively old knowledge of this method, it could not be used in practice because of the absence of a mechanism for implementation of the method on commercial scale which mechanism should permit concurrent rotation of a large number (tens and hundreds) of bags at desired angle.

It is an object of the invention to improve throughput capacity of bag filter for cleaning gases from dust.

This object is accomplished by that in a bag filter for cleaning gases from dust comprising a casing, rows of substantially vertically extending bags of filtering cloth accommodated in the casing having their open lower ends which are fixed to and communicate with a hopper for removed dust which is located in the bottom part of the casing and separated from the inner space thereof, and the upper ends closed by caps supporting vertical rods connected to a mechanism for removing dust from the filtering cloth of the bags, as well as pipes for feeding dust-laden gas to the hopper and for removing cleaned gas from the casing, according to the invention, the mechanism for removing dust from the filtering cloth of the bags comprises pulleys secured to the ends of the rods, each pulley having two flexible drawbars secured with their ends to the pulley and running in opposite directions therefrom, the other ends of the drawbars being secured to horizontal bars extending along rows of said pulleys and having a drive for causing their longitudinal reciprocations, the dimensional proportioning of the mechanism for removing dust from the filtering cloth being selected in such a manner that during longitudinal displacement of the bars, the caps of the bags are rotated at a twisting angle $\phi$ which is determined from the formula:

$$5 \leq \phi : (l/d \leq 20,$$

wherein
 $l$ is length of the bag,
 $d$ is diameter of the bag.

In the bag filter for cleaning gases from dust according to the invention, efficient and uniform removal of dust from the filtering cloth of the bag is ensured over the entire surface thereof continuously during operation of the bag filter. This, in turn, provides for a constant thickness of dust layer on the filtering cloth, that is constant flow resistance of the filtering cloth and constant throughput capacity and cleaning efficiency of the filter. It should be also noted that the construction of the mechanism for removing dust from the filtering cloth provides for simple control of intensity of mechanical action on the bags.

As a result of the use of the bag filter according to the invention, specific throughput capacity in terms of gas quantity is improved by 1.5-2 times with the same hydraulic resistance of the filtering cloth and cleaning efficiency as compared with the known bag filters, and this, in turn, enables 2-3 times reduction of filtering cloth consumption, 1.5-2 times reduction of production area and considerable lowering of investments.

The mechanism for removing dust from the filtering cloth in the bag filter according to the invention operates without noise, it is simple and reliable in operation and practically maintenance- and repair-free.

The invention will now be described with reference to embodiments thereof illustrated in the accompanying drawings, in which.

Figure 1:
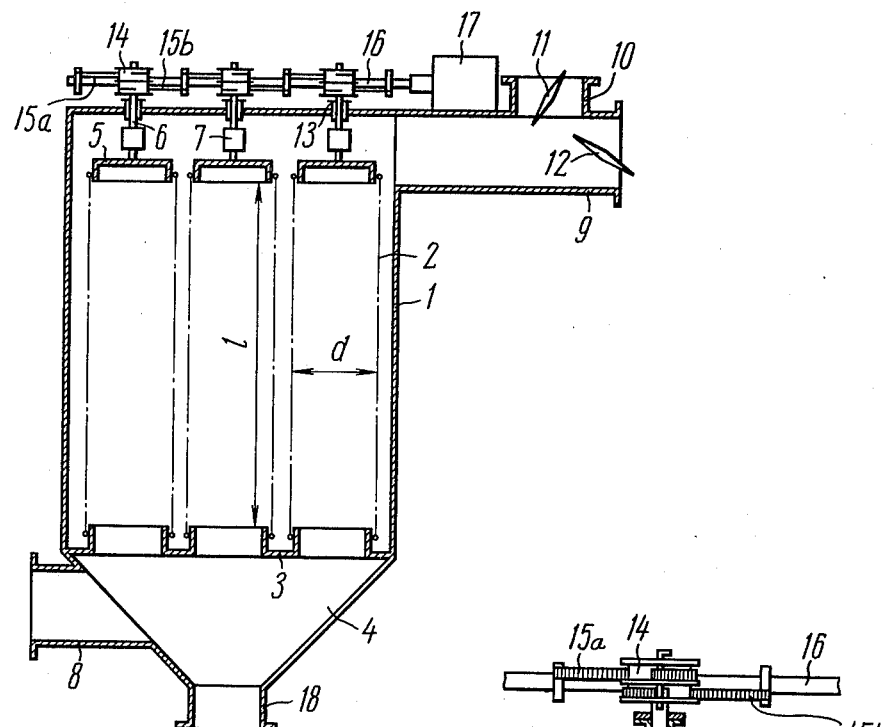
FIG. 1 shows a longitudinal section of the bag filter for cleaning dust-laden gases according to the invention.

The bag filter for cleaning dust-laden gases comprises a casing 1 (FIG. 1) accommodating rows of substantially vertically extending bags 2 of filtering cloth. Open lower ends of the bags 2 are fixed to a manifold 3 separating the inner space of the casing 1 from a hopper 4 located in the bottom part thereof. Upper ends of the bags 2 are closed by caps 5 supporting rods 6. A tensioning device 7 of conventional type is incorporated in the rods 6 for maintaining the bag 2 in tensioned state during its twisting. The bag filter has a pipe 8 for feeding dust-laden gas to the hopper 4 and a pipe 9 for removing cleaned gas from the casing 1, a pipe 10 for reversed blowing, valve 11 for switching over gas flows during reversed blowing, and a control valve 12.

Figure 2:
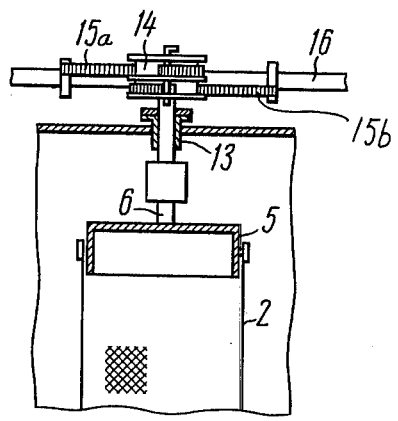
FIG. 2 shows an enlarged detail of coupling of the upper end of the bag to the mechanism for removing dust from the filtering cloth according to the invention.
Figure 3:
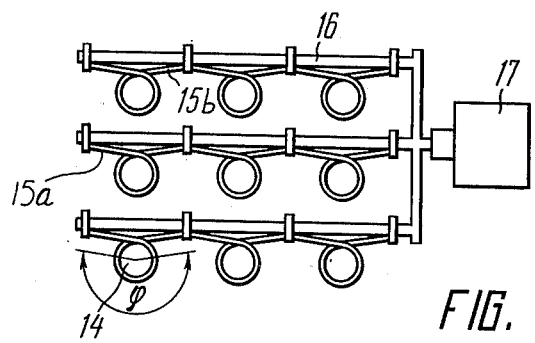
FIG. 3 is a plan view of the mechanism for removing dust from the filtering cloth according to the invention.

The rod 6 of each cap 5 extends outside the casing 1 through a packing 13 (FIGS. 1,2). A means is operatively connected with each cap 5 for angularly oscillating the latter, and thus each bag 2 fixed thereto, about the vertical axis of the latter bag, this means including pulleys 14 respectively secured to the ends of the rods 6 projecting outside the casing 1, and two flexible drawbars 15a, 15b, secured with their ends to each pulley so that they run from each pulley 14 in opposite directions as shown in FIG. 3. Other ends of the flexible drawbars 15a, 15b are secured to horizontal bars 16 extending along rows of the pulleys 14. The bars 16 are provided with a drive 17 (FIG. 3) for imparting longitudinal reciprocatory motion thereto.

As is most clearly apparent from FIG. 2, each drawbar 15a is fixed at one free end to an upper portion of each pulley 14 and extends in a counterclockwise direction about the pulley 14, as is apparent from FIG. 3, to the left, as viewed in FIGS. 2 and 3, beyond the pulley 14 up to the free end of each upper drawbar 15a which is fixed to a horizontal bar 16 in the manner apparent from the drawings. Each drawbar 15b is fixed at a free end thereof to each pulley 14 while being situated at an elevation lower than the drawbar 15a and extending in a clockwise direction around the pulley 14, as viewed in FIG. 3, so that each drawbar 15 extends to the right beyond the pulley 14 to which it is connected, as viewed in FIGS. 2 and 3. The right free end of each drawbar 15b is fixed to the horizontal bar 16 in the manner apparent from the drawings. Thus, as a horizontal bar 16 is moved to the left, as viewed in the drawings, the upper drawbar 15a will unwind from the pulley 14 to which it is connected while the drawbar 15b will become further wound thereon, and each cap 5 will be angularly turned through a given angle in one direction. On the other hand when each horizontal bar 16 is moved to the right, as viewed in FIG. 2, the drawbar 15b will unwind to a given extent from the pulley 14 to which it is connected while the upper drawbar 15a will become wound to a further extent on the pulley 14, and thus the cap 5 will be angularly turned in an opposite direction.

The bottom part of the hopper 4 (FIG. 1) is provided with a pipe 18 for discharging the removed dust.

A very important feature providing for improvement of throughput capacity of the bag filter consists in rotation of the caps 5 of the bags 2 at a twisting angle $\phi$ which is determined from the formula:

$$5 \leq \phi : (l/d) \leq 20,$$

wherein
$l$ is length of the bag (FIG. 1),
$d$ is diameter of the bag.

The twisting angle $\phi$ (FIG. 3) of the cap 5 (FIG. 1) of the bag 2 depends on dimensional proportioning of the mechanism for removing dust from the filtering cloth, and namely on the stroke of the bar 16, length of runs of the flexible drawbars 15a, 15b and diameter of the pulleys 14. By selecting these variables, the twisting angle $\phi$ may be varied over a wide range.

The mechanism for removing dust from the filtering cloth ensure the technical result only if the dimensional proportioning mentioned above is complied with.

With $\phi : (l/d) \leq 5$ there is no improvement of throughput capacity, while with $\phi : (l/d) \leq 20$ the dust catching efficiency is materially impaired.

In the embodiment of the bag filter shown in the drawings, the rods 6 (FIG. 1) extend outside the casing 1, and the mechanism for removing dust from the filtering cloth of the bags 2 is located outside the casing 1. It is, however, noted that the mechanism for removing dust from the filtering cloth may be accommodated within the casing 1 (not shown). In such case, the manufacture of the bag filter is simplified because there is no need in providing a plurality of packings 13 for sealing the rods 6 extending outside the casing 1, but certain operational inconveniences may arise because the access to the mechanism for removing dust and its maintenance become difficult.

The above-described bag filter for cleaning gases functions in the following manner.

Dust-laden gas is fed, via the pipe 8 and hopper 4, to the bags 2 to be cleaned by passing through the filtering cloth. Cleaned gas leaves the casing 1 through the pipe 9. Removed dust falls down from the filtering cloth of the bags 2 to the hopper 4 and is discharged therefrom through the pipe 18.

During operation of the bag filter, the bars 16 are continuously caused to reciprocate under the action of the drive 17 to rotate, by means of the flexible drawbars 15a, 15b, the pulleys 14 which, in turn, cause rotation of the caps 5 with the upper ends of the bags 2 secured thereto, by means of the rods 6, at a pre-set angle $\phi$ (FIG. 3) alternately in opposite directions. The layer of dust on the filtering cloth of the bags 2 is broken up, and dust falls down to the hopper 4 (FIG. 1). As a result, during operation of the bag filter, the major part of the retained dust is continuously removed from the filtering cloth, and a small layer of dust of contsant thickness is maintained on the filtering cloth thus providing for efficient gas cleaning with improved throughput capacity of the bag filter.

In a number of applications, in order to obtain a greater throughput capacity, reversed blowing is switched on, in addition to the twisting regeneration of the filtering cloth. For that purpose, the valve 12 is closed, the valve 11 is opened, and air is fed through the filtering cloth in the direction opposite to that of the flow of dust-laden gas.

What is claimed is:

1. A bag filter for cleaning gases from dust comprising: a casing; bags of filtering cloth accommodated in rows in said casing and extending substantially vertically; lower ends of said bags being fixed to the casing; upper ends of said bags; caps closing said upper ends of the bags; vertical rods secured to said caps; a mechanism for removing dust from the filtering cloth of said bags; pulleys of said mechanism for removing dust secured to said rods; flexible drawbars of said mechanism for removing dust each drawbar having one end secured to said pulleys, two flexible drawbars being secured to each pulley to run therefrom in opposite directions: horizontal bars of said mechanism for removing dust extending along the rows of said pulleys, the other ends of the flexible drawbars running from the pulleys of the row, along which said bar extends, being secured to the bar; a drive for causing longitudinal reciprocations of said bars for rotating the caps and twisting the bags secured thereto, the dimensional proportioning of said mechanism for removing dust being selected in such a manner that the caps are rotated at a twisting angle $\phi$ which is determined from the formula:

$$5 \leq \phi : (l/d) \leq 20,$$

wherein $l$ is length of the bag,
$d$ is diameter of the bag;
a hopper for catched dust which is located in the bottom part of said casing, separated from the inner space thereof and communicates with said bags; a pipe for feeding dust-laden gas to said hopper; a pipe for removing cleaned gas from said casing.

* * * * *